(12) United States Patent
Siltala (10) Patent No.: US 10,670,073 B2
(45) Date of Patent: Jun. 2, 2020

(54) ROTATION UNIT AND METHOD OF ADJUSTING BEARING CLEARANCE

(71) Applicant: SANDVIK MINING AND CONSTRUCTION OY, Tampere (FI)

(72) Inventor: Hannu Siltala, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 127 days.

(21) Appl. No.: 15/921,454

(22) Filed: Mar. 14, 2018

(65) Prior Publication Data

US 2018/0266485 A1    Sep. 20, 2018

(30) Foreign Application Priority Data

Mar. 17, 2017   (EP) .................................... 17161506

(51) Int. Cl.

| | |
|---|---|
| *E21B 3/02* | (2006.01) |
| *F16C 33/36* | (2006.01) |
| *F16C 19/36* | (2006.01) |
| *F16C 25/06* | (2006.01) |
| *F16C 17/04* | (2006.01) |
| *F16C 19/54* | (2006.01) |
| *F16C 19/34* | (2006.01) |
| *E21B 3/04* | (2006.01) |
| *E21B 7/02* | (2006.01) |

(52) U.S. Cl.
CPC .............. *F16C 19/364* (2013.01); *E21B 3/02* (2013.01); *E21B 3/04* (2013.01); *E21B 7/025* (2013.01); *F16C 17/04* (2013.01); *F16C 19/34* (2013.01); *F16C 19/548* (2013.01); *F16C 25/06* (2013.01); *F16C 33/366* (2013.01); *F16C 2229/00* (2013.01); *F16C 2352/00* (2013.01)

(58) Field of Classification Search
CPC .. E21B 3/02; E21B 3/04; F16C 33/366; F16C 2229/00
USPC ........................................ 384/522, 551, 554
See application file for complete search history.

(56) References Cited

U.S. PATENT DOCUMENTS

| | | | |
|---|---|---|---|
| 1,294,792 A | 2/1919 | Gray | |
| 5,961,221 A * | 10/1999 | Kamimura | ............... F16C 19/38 384/447 |
| 6,505,972 B1 | 1/2003 | Harbottle et al. | |
| 7,344,313 B2 * | 3/2008 | Hansen | .................. F16C 35/073 384/538 |
| 8,745,875 B1 * | 6/2014 | Hagelthorn | ........... F16C 41/008 29/724 |

(Continued)

FOREIGN PATENT DOCUMENTS

| | | |
|---|---|---|
| CA | 2905472 A1 | 4/2016 |
| JP | H01135916 A | 5/1989 |
| JP | 2013170656 A | 9/2013 |

*Primary Examiner* — Kenneth L Thompson
(74) *Attorney, Agent, or Firm* — Corinne R. Gorski (57) ABSTRACT

The present disclosure relates to a rotation unit and method for adjusting bearing clearance. The rotation unit includes a shaft that is rotated around its longitudinal axis by a rotating motor. The shaft is supported to a body of the rotation unit by a bearing assembly. The rotation unit further includes an adjusting arrangement for generating pre-load for the bearing assembly and adjusting bearing clearance. The adjusting arrangement includes an axial adjusting space and at least one pair of half-elements arranged between axial adjusting surfaces limiting the adjusting space.

13 Claims, 4 Drawing Sheets

(56) References Cited

U.S. PATENT DOCUMENTS

| | | | |
|---|---|---|---|
| 2005/0269072 A1* | 12/2005 | Folk | E21B 19/08 166/90.1 |
| 2007/0193032 A1* | 8/2007 | Takimoto | B60B 27/001 29/898 |
| 2008/0217037 A1* | 9/2008 | Howell | E21B 7/022 173/28 |
| 2010/0089646 A1 | 4/2010 | Drivdahl et al. | |
| 2015/0043858 A1 | 2/2015 | Aust et al. | |
| 2017/0159360 A1* | 6/2017 | Netecke | E21B 3/02 |
| 2018/0252262 A1* | 9/2018 | Eidloth | F16C 43/06 |

* cited by examiner

FIG. 9

ROTATION UNIT AND METHOD OF ADJUSTING BEARING CLEARANCE

RELATED APPLICATION DATA

This application claims priority under 35 U.S.C. § 119 to EP Patent Application No. 17161506.5, filed on Mar. 17, 2017, which the entirety thereof is incorporated herein by reference.

TECHNICAL FIELD

The disclosure relates to a rotation unit for rock drilling arranged to generate the required rotation for drilling equipment, which is connected to the rotation unit. The drilling equipment is provided with a drill bit for breaking rock. Axial forces are transmitted through the rotation unit during the drilling. The rotation unit is without a percussion device. Further, the invention relates to a method for adjusting bearing clearance of a rotation unit.

BACKGROUND

Holes can be drilled in rock by utilizing rotary drilling or down-the-hole drilling (DTH). A rotary drilling machine and a DTH drilling machine both include a rotation unit for rotating a drilling tool. The rotation unit includes a shaft that is rotated around its longitudinal axis. Rotation and torque is generated by one or more rotating motors connected to the shaft through a gear system or transmission members. During the drilling operation the rotation unit is fed axially by means of a feed device in a drilling direction and return direction. Thus, the shaft of the rotation unit is subjected to rotational and axial forces.

The shaft is supported to a body of the rotation unit by means of bearings. Proper operation of the bearings require that clearances of the bearings are inside predetermined limits. Further, the bearings often require use of a defined pre-load. However, the bearing clearance and the pre-load change when the bearings settle during use after the installation and when the bearings are subjected to wear. Therefore, the bearing clearance and the pre-load needs to be checked and adjusted according to a service plan. Structures of the known rotation units require complicated and time-consuming measures for executing the needed service.

SUMMARY

To overcome the above disadvantages, the present disclosure is directed to a novel and improved rotation unit and method for adjusting bearing clearance.

An aspect of the disclosed solution is that the rotation unit includes a shaft, which is supported to a body of the rotating unit and may be rotated around axial centre line of the shaft by means of one or more rotating motors. The shaft is bearing mounted to the body by means of one or more bearing assemblies. Pre-load may be directed to the bearing assembly in order to influence to bearing clearance and to ensure proper operation of the bearing assembly. The rotation unit is provided with an adjusting arrangement for generating the pre-load force and to secure the adjusted bearing clearance. The adjusting arrangement includes an axial adjusting space on the outer surface of the shaft. The adjusting space is limited axially by axial adjusting surfaces of the shaft and the bearing assembly. Thus, the adjusting space is radially open, in other words laterally accessible, and may thereby receive half-elements in transverse direction of the shaft. Two half-elements are installed in pairs and they form an operative couple. The half-elements arranged to the adjusting space ensure that the adjusted pre-load and the bearing clearance remain as adjusted.

The use of the laterally mountable half-elements and the laterally accessible axial adjusting space for the half-elements facilitate and quickens adjusting and inspection of the bearing clearance. The easy installation of the half-elements is due the lateral installation direction. The mounting and dismounting of the half-elements does not necessarily require removal of any axial components. Further, the half-elements are simple, durable and inexpensive components. One additional benefit is that use of the present solution does not require any special tools or skills. An additional benefit of the half elements is that they endure well high torque loads and axial stress pulses and pulsating stress waves and are thereby also suitable to be used in percussive drilling.

According to an embodiment, between the bearing assembly and adjusting arrangement a collar is arranged to be axially movable on the shaft of the rotation unit. Alternatively, any other axially movable intermediate element may be arranged between the bearing assembly and the adjusting arrangement for transmitting the adjusting forces. By means of the collar or corresponding element the adjusting space wherein the half-elements are intended to be arranged may be located at a suitable position in order to avoid need for disassembling the structure of the rotation unit. The collar may be dimensioned to extend from the bearing assembly to outside of the body, whereby the half-elements may be installed without dismounting the body.

According to an embodiment, the collar disclosed in the previous embodiment is sealed to the body and to the shaft. Between an outer rim of the collar and the body may be one or more sealing elements, and correspondingly between an inner rim of the collar and the shaft may be one or more sealing elements.

According to an embodiment, the mentioned two half-elements form an operational couple and are mounted to the adjusting space in opposite directions relative to each other and in transverse direction relative to the axial direction of the shaft.

According to an embodiment, the axial space between the axial adjusting surfaces is located at least partly outside the body of the rotating unit. The shaft protrudes from the body at a tool end portion of the shaft and the axial adjusting space is located at the protruding portion. This way, the adjusting arrangement is easily reached and there is no need to disassemble the body. However, the axial adjusting space and adjusting arrangement may be protected against dirt and moisture by means of an easily removable end cover, for example.

According to an embodiment, the bearings of the shaft have at least one pair of cone roller bearings mounted to bearing housings of the body. The two cone roller bearings form an operational couple wherein the bearings are directed to opposite directions on the shaft. The mounted pair of cone roller bearings should be set so that a specific amount of axial clearance or end play exists in the bearing. Typically, slight pre-load is set for the bearing to increase bearing life and rigidity of the rotation unit. When the preload is set properly, the rollers of the bearings are in axial interference with their races and there is no axial shaft movement.

According to an embodiment, the shaft is bearing mounted to the body with one single bearing assembly comprising a first cone roller bearing and a second cone roller bearing, which form a pair being capable to support the shaft in the radial and axial directions. Both cone roller bearings are supported to the body at an axial portion between the bearings. Between the cone roller bearings the body may be have a support protrusion or part provided with mating surfaces against which outer races of the cone roller bearings are arranged. Thus, the support part may form part of a bearing housing. The first cone roller bearing is on the side of the adjusting space and the second cone roller bearing is at the side of the opposite end portion of the shaft. Further, the shaft includes a shoulder or corresponding support surface for transmitting the pre-load force also to the second cone roller bearing. Thus, the first and second cone roller bearings are compressed against their bearing housings.

According to an embodiment, each of the half-elements have a half-ring configuration. Thereby, the elements may have a relatively simple shape and are easy to manufacture. Further, the size of an outer rim of the half-element may correspond to the size of an outer rim of the shaft.

According to an embodiment, the half-elements are mountable and dismountable without dismounting the body and without removing drilling equipment connected to one end of the shaft during use of the rotation head. When the structure of the rotation unit doesn't need to be disassembled for executing the clearance adjustment, the adjusting work is fast and easy to execute. The means for executing the adjustment is located outside the body. Since the body of the rotation unit is not dismounted, there is no need to drain lubricating oil for the adjusting measures. Thereby, the adjusting work and inspections may be done anywhere, even at a work site, and the rotation unit may be kept fastened to a drilling unit during the adjusting and inspection measures.

According to an embodiment, the adjusting arrangement include a separate or external pre-load member for generating the desired pre-load force and bearing clearance. In other words, the pre-load force is not generated by means of the half-elements, but instead a separate force generating device is utilized for the purpose. The external force device may be a fluid operated actuator, such as a hydraulic cylinder, for example. Alternatively, mechanical machine elements based on wedge surfaces, lever arms or screw elements may be utilized as operational elements of the external force devices for generating the needed pre-load force. In this embodiment, the half-elements are arranged to the adjusting space after the separate force device has been activated and when a desired axial distance is formed between the axial surfaces limiting the adjusting space. Thereafter, a needed amount of half elements may be installed between the axial surfaces to fill the space between them and to thereby secure that the adjusted bearing clearance remains after the separate force device is deactivated and removed.

According to an embodiment, the two half-elements forming an operating couple have both uniform thickness. Thus, the two half-elements may form together an improved two-part shim, which may be divided into pieces for facilitating the mounting and dismounting. This kind of half-element couples may be utilized when the needed pre-load force is generated by external force means.

According to an embodiment, the adjusting arrangement includes two or more operating couples having differing thickness relative to each other. This way, there may be a set of half-elements with differing thickness so that a suitable combination of several half-elements may be placed to the adjusting space in order to tightly fill the gap between the axial surfaces.

According to an embodiment, the half-elements are configured to generate the pre-load force and the bearing clearance. In this embodiment, the half elements have dual purpose, firstly to generate the pre-load force, and secondly to secure the adjusted pre-load and clearance for the bearing assembly. An advantage of this embodiment is that no separate force generating device is needed for the adjusting work. Thus, this embodiment provides a compact solution.

According to an embodiment, at least some of the half-elements are provided with wedge surfaces for generating the pre-load by moving the half-elements transversally relative to each other and relative to the adjusting space. The wedge surfaces are relatively simple to form to the half-elements and they endure loads well since force transmitting surfaces may be relatively large. Further, it is also possible to generate forces with great magnitude by means of the wedge surfaces.

According to an embodiment, at least some of the half-elements are provided with wedge surfaces for generating the pre-load by moving the half-elements transversally by means of tensioning members, such as tensioning screws. When the half-elements with the wedge surfaces are moved relative to each other in the transverse direction of the shaft, then the axial adjusting surfaces move either apart from each other or towards each other, depending on the direction of the adjusting movement. The use of the tensioning screws for moving the wedge surfaces allow accurate adjustment of the pre-load.

According to an embodiment, the pre-load force is generated by means of wedge surfaces of the half-elements. Then, the adjusting arrangement may include at least two first half-elements, which both have a wedge-like configuration. This means that at least one surface of both of the half-elements is slanted. The first half-elements with wedge portions form an operational couple and are movable in a transverse direction relative to the axial direction of the shaft. The transverse adjusting movement of the first half-elements is produced by means of tensioning members, such as adjusting screws. The wedge-like half-elements may be moved towards each other and apart from each other between the axial adjusting surfaces in order to have effect on axial tension of the bearing assembly. The wedge surfaces of the first half-elements may be set against wedge-shaped axial adjusting surfaces. Alternatively, additional half-elements with wedge-shaped support surfaces may be set against wedge-shaped surfaces of the first half-elements.

According to an embodiment, the adjusting arrangement may include two first half-elements with wedge surfaces and two additional second half-elements also provided with wedge surfaces. The wedge surfaces of the first half-elements and the second half-elements are set against each other. When the first half-elements and the second half-elements are moved relative to each other in the transverse direction of the shaft the axial adjusting surfaces move either apart from each other or towards each other, depending on the direction of the adjusting movement. In this embodiment, only the half-elements are provided with wedge surfaces, whereby there is no need to form wedge surfaces machine elements having a bigger size and more complicated structure. When the wedge surfaces are part of the half-elements, it is easy to provide them with surface coating or hardening.

According to an embodiment, the half-elements provided with wedge surfaces are provided with an integrated tensioning arrangement for generating transverse movement and the pre-load. Magnitude of the generated pre-load is determined by detecting force or torque of the tensioning arrangement. When the tensioning arrangement is some screws, then tightening torque of the screws is proportional to the generated pre-load. This way, only a torque wrench and calculated pre-set torques are needed to adjust a proper pre-load. A further advantage is that no special skills are needed for executing the adjustment.

According to an embodiment, at least one operational couple of transversally adjustable half-elements is provided with a locking device for preventing transversal movements of the half-elements after adjustment is finished and the positions of the half-elements are locked. The locking may be accomplished by means of one or more axial fastening screws, for example. The fastening screws prevent radial movements of the half-elements. Instead of locking screws any other machine elements may be used to prevent the half-elements to move after the adjustment.

According to an embodiment, the rotation unit is intended for rotary drilling, in which drilling takes place by the effect of mere rotation and feed force without any percussion device.

According to an embodiment, the rotation unit is intended for DTH drilling, in which the rotation unit and the percussion device are located in opposite end portions of the drilling equipment. Hence, there is no percussion device in the rotation unit but it is connected with the drilling equipment. The drill bit is typically attached directly to the percussion device.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE DRAWINGS

In the figures, some embodiments of the invention are shown simplified for the sake of clarity. Like reference numerals refer to like parts in the figures.

DETAILED DESCRIPTION

Figure 1:
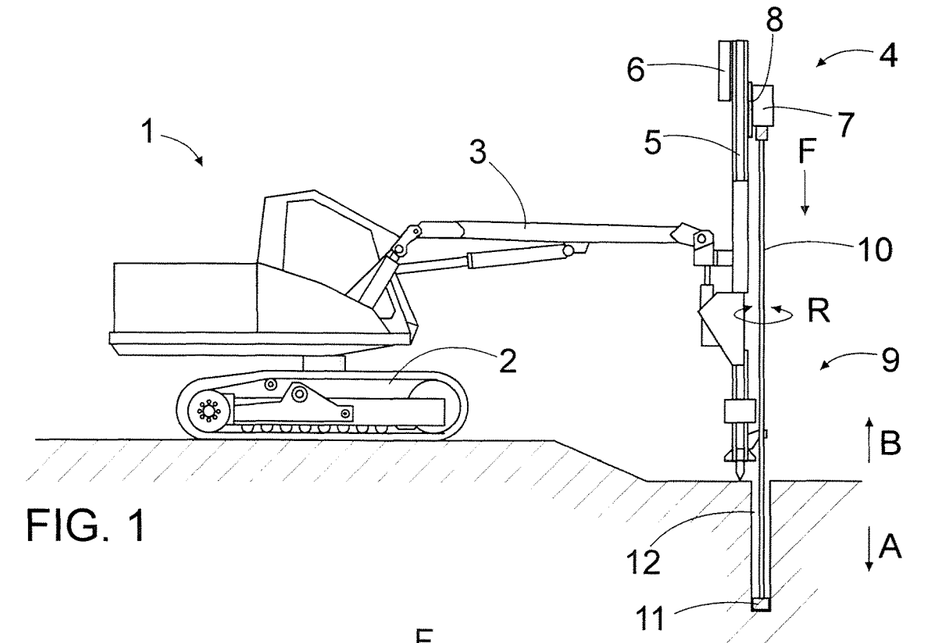
FIG. 1 shows schematically a rock drilling rig provided with a rotation unit for rotating drilling equipment around its longitudinal axis.

FIG. 1 shows a rock drilling rig 1, which includes a carrier 2 provided with a drilling boom 3. The boom 3 is provided with a rock drilling unit 4 having a feed beam 5, a feed device 6 and a rotation unit 7. The rotation unit 7 may be connected to a carriage 8 by means of which it may be supported movably to the feed beam 5. The rotation unit 7 may be provided with drilling equipment 9 which may include one or more drilling tubes 10 connected to each other, and a drill bit 11 at the outermost end of the drilling equipment.

The drilling unit 4 of FIG. 1 is intended for rotary drilling in which the rotation unit 7 is used for rotating the drilling equipment 9 around its longitudinal axis in direction R and, at the same, the rotation unit 7 and the drilling equipment 9 connected to it are fed with feed force F by means of the feed device 6 in drilling direction A. Thus, the drill bit breaks rock due to the effect of rotation R and feed force F, and a drill hole 12 is formed. When the drill hole 12 has been drilled to a desired depth, the drilling equipment 9 can be pulled by means of the feed device 6 out of the drill hole 12 in return direction B, and the drilling equipment can be disassembled by unscrewing connection threads between the drilling tubes 10 by means of the rotation unit 7.

Figure 2:
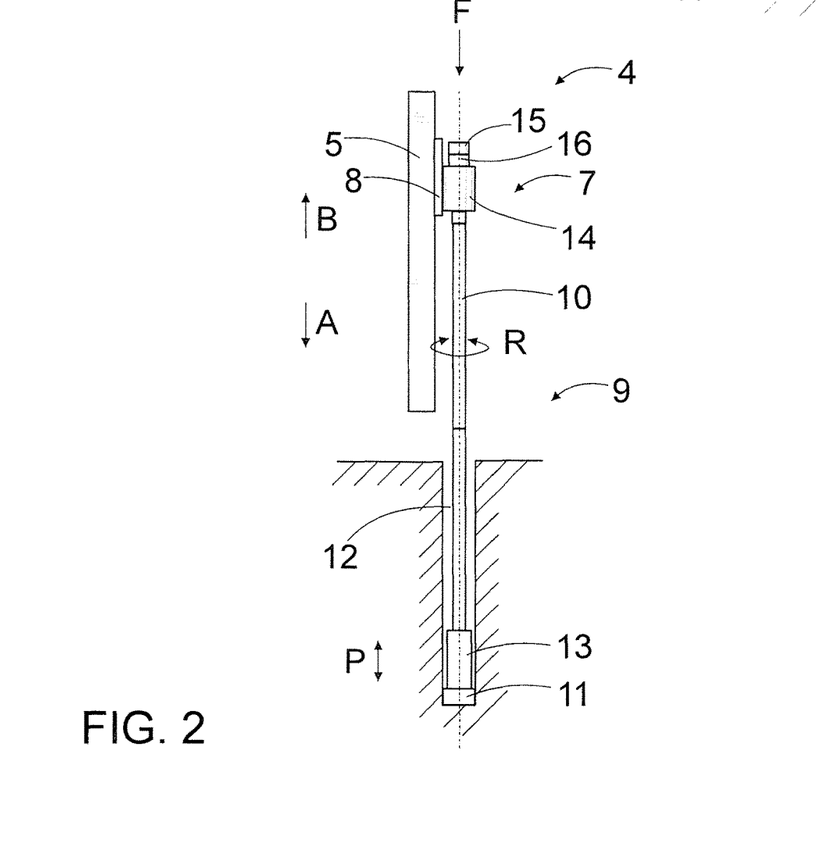
FIG. 2 shows schematically the principle of DTH drilling and the operation of a rotation unit in it.

FIG. 2 shows a second drilling unit 4, which differs from the one in FIG. 1 in such a way that the drilling equipment 9 is provided with a percussion device 13. Thus, the percussion device 13 is at the opposite end of the drilling equipment 9 in relation to the rotation unit 7. During drilling, the percussion device 13 is in the drill hole, and the drill bit 11 may be connected directly to the percussion device 13. The rotation unit 7 has a shaft 14, one or more rotating motors 15 and a transmission arrangement 16 for transmitting the torque to the shaft.

Figures 3, 4:
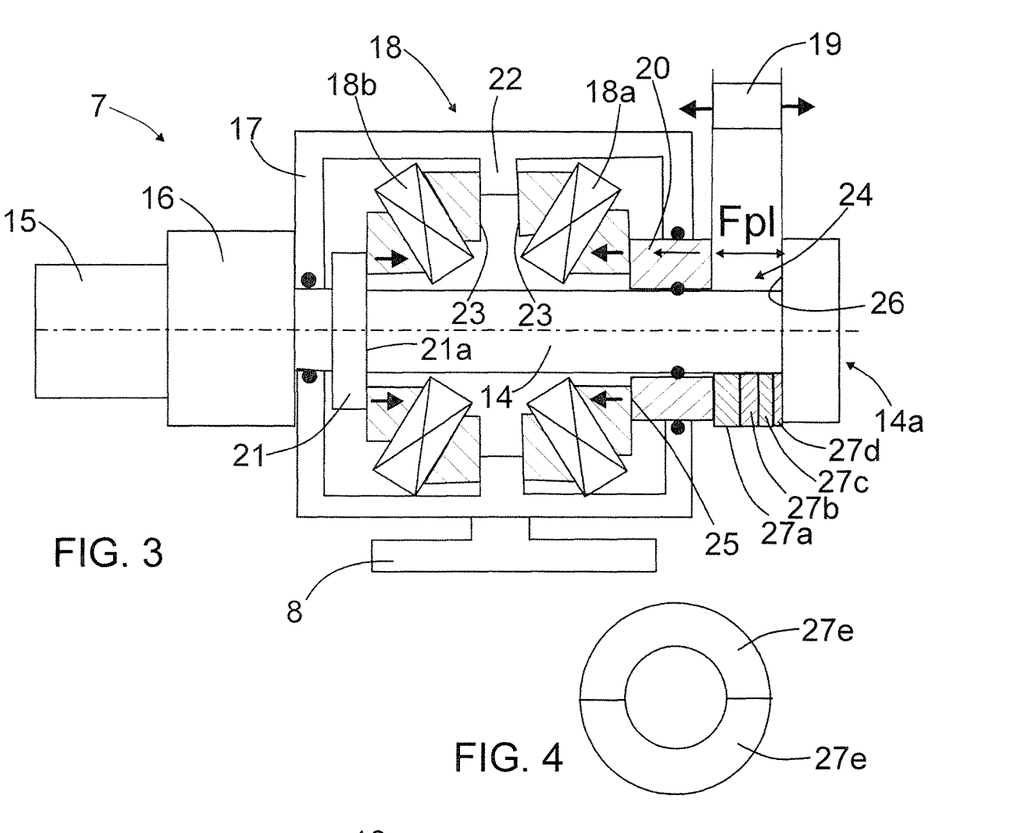
FIG. 3 is a schematic partial cross-sectional side view of a rotation unit, wherein an adjusting space has several half-elements, which serve as shims and secure pre-load being generated by means of an external force device.
FIG. 4 shows schematically two half-elements forming an operating couple.

FIG. 3 shows one possible embodiment of the rotation unit 7. The rotation unit 7 has a shaft 14, which is supported by a body 17 by means of a bearing assembly 18 which may serve as radial and axial bearings. The bearing assembly 18 may include two bearings 18a and 18b, which are located at an axial distance from each other. The bearings 18a, 18b may be cone roller bearings.

Figure 9:
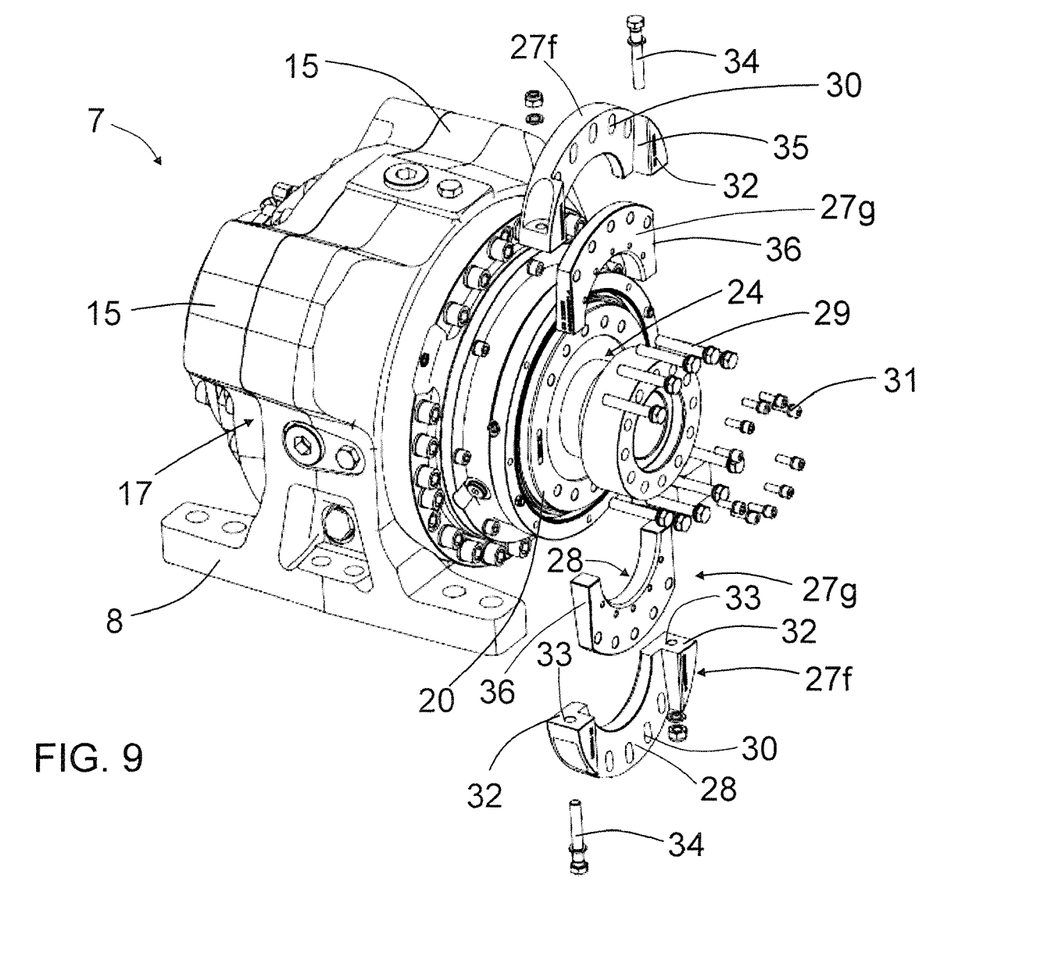
FIG. 9 shows schematically a rotation unit and adjusting arrangement.

The rotation unit 7 further includes at least one rotation motor 15 for producing needed rotation movement and torque. Rotation may be transmitted by means of a transmission arrangement 16 to the shaft 14. The transmission arrangement 16 may have a gear system and suitable transmission elements. In the disclosed solution, the rotation motor 15 and the transmission arrangement 16 are located on the same axial line. However, as shown in FIG. 9 there may be several rotating motors arranged on a periphery of the rotation unit 7. A front end 14a of the shaft 14 may include splines, a set of grooves, or corresponding rotation transmission means for transmitting the torque to drilling equipment.

The rotation unit 7 further includes an adjusting arrangement for securing pre-load of the bearings generated by means of an external force device 19, which may be installed in place only for the duration of the adjustment. The external force device 19 may be connected between the shaft 14 and a collar 20 by means of suitable connecting means. The external force device may generate the desired pre-load force Fpl by a hydraulic actuator or an extendable screw mechanism, for example. The collar 20 is arranged axially movable with respect to the shaft whereby it transmits axial forces towards axial adjusting surfaces of the first bearing 18a. The pre-load force Fpl is also transmitted to the second bearing 18b by means of a shoulder 21 and its axial surface 21a. Arrows indicate the forces in FIGS. 3, 5, 7 and 8. As can be noted, the bearings 18a, 18b are compressed towards each other, whereby they are pressed against support surfaces of the body 17. The body 17 may have protrusions 22 and bearing houses between the bearings 18a, 18b, so that the bearings are pressed against axial support surfaces 23 of the protrusions 22.

At a portion of the front end 14a of the shaft 14 there is located an axial adjusting space 24. The axial adjusting space 24 is located between an axial adjusting surface 25 of the first bearing 18a and an axial adjusting surface 26 of the shaft 14. The adjusting space 24 is thereby on the outer surface of that shaft 14 and is radially open. The collar 20 may be arranged with the adjusting space 24 for transmitting the force to the first bearing 18a. Between a front end of the collar 20 and the axial adjusting surface 26 of the shaft 14 is an axial gap, which may be filled with one or more half-elements 27a-27d. The half-elements 27 may be planar elements having different thickness. For improving clarity, FIG. 1 shows only the lower half-elements in the adjusting space.

In practice, the half-elements are installed in pairs to the adjusting space 24 so that they form rigid and steady support. However, the half-element configuration and the radially open adjusting space allow the half-elements to be mounted separately. FIG. 4 shows half-elements 27e, which both have a shape of a half-ring and which together form an operating couple.

FIG. 3 further discloses that axial length of the collar 20 may be dimensioned to extend outside the body 17, whereby the adjusting space 24 is operable without dismounting the body 17. The collar 20 may be sealed to the body 17 and to the shaft 14.

The above disclosed basic structure and operating principles concern also the solutions of the other Figures. It should be noted that FIGS. 3-8 are simplified presentations and show the features in an exaggerated manner for improving clarity.

Figure 5:
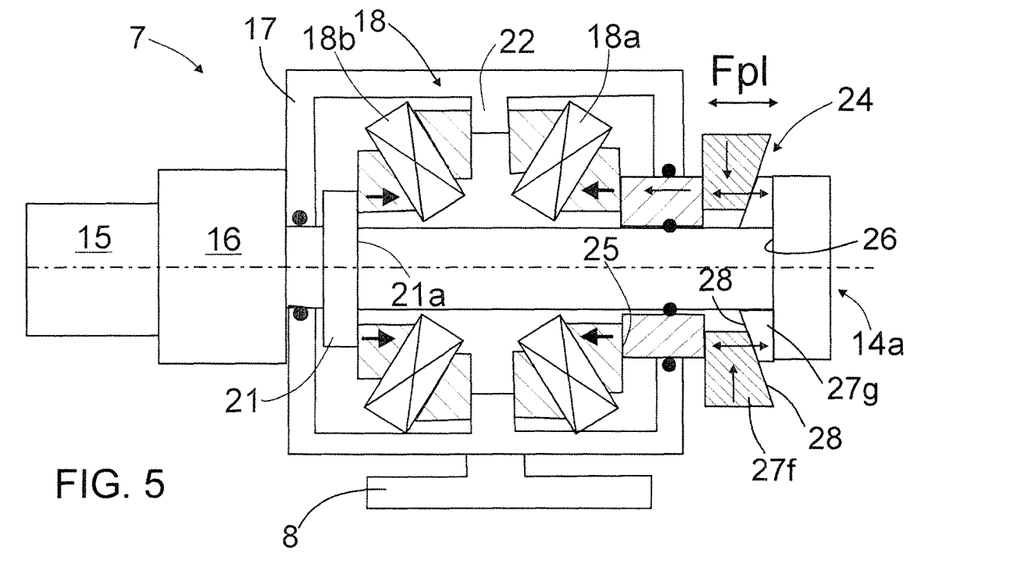
FIG. 5 shows schematically a partly cross-sectional side view of a rotation unit, wherein pre-load force is generated by means of wedge surfaces of first and second half-elements arranged to the adjusting space.

FIG. 5 discloses a substantially similar rotation unit 7 as FIG. 3, except that in FIG. 3 first half-elements 27f and second half elements 27g have wedge surfaces 28, which are arranged against each other and are configured to generate the needed adjusting force. Thus, the solution of FIG. 3 is without any external force device.

When the first half-elements 27f are moved relative to the second half-elements 27g in the transverse direction, the distance between the axial adjusting surfaces 25 and 26 is changed. By pressing the first half-elements 27f towards each other, pre-load force Fpl may be generated. The force effect is transmitted to the bearings 18a and 18b as it is disclosed in the description of FIG. 3 above.

Figure 6:
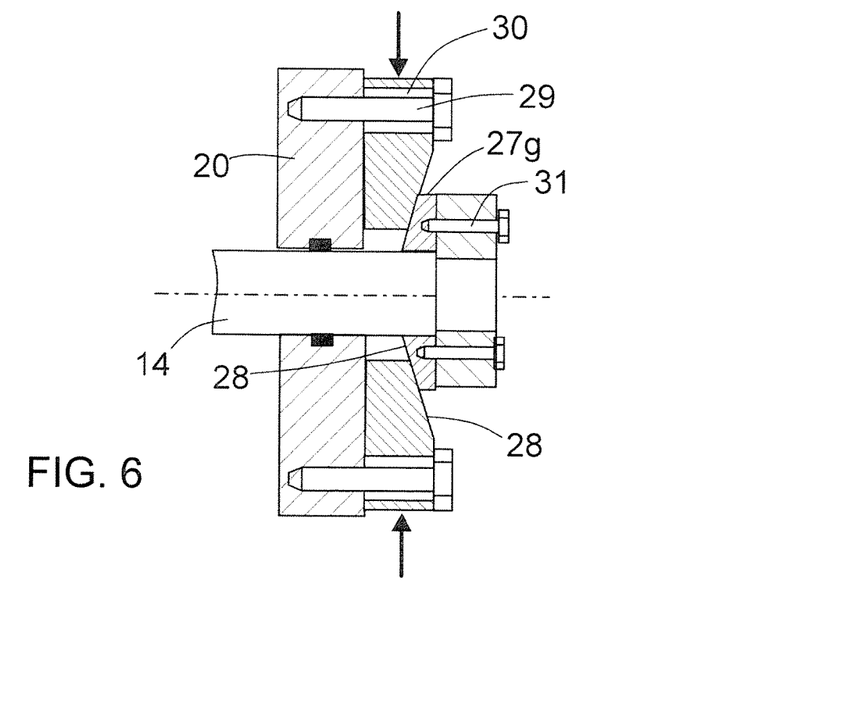
FIG. 6 is a schematic cross-sectional side view of the rotation unit, wherein half-elements arranged to the adjusting space are locked by means of axial locking screws.

FIG. 6 shows a detail of a solution of FIG. 5. The half-elements 27f and 27g including the wedge surfaces 28 may be locked radially immovably after the adjusting operation. This way, the accurately adjusted preload and bearing clearance may be retained. The first half-elements 27f may be fastened to the collar 20 by means of axial first fastening screws 29. Fastening holes 30 of the first fastening screws 29 may be over dimensioned or shaped to be oval in order to allow transversal adjusting movement of the first half-elements. The second half-elements 27g may be fastened to the shaft 14 by means of axial second fastening screws 31.

Figure 7:
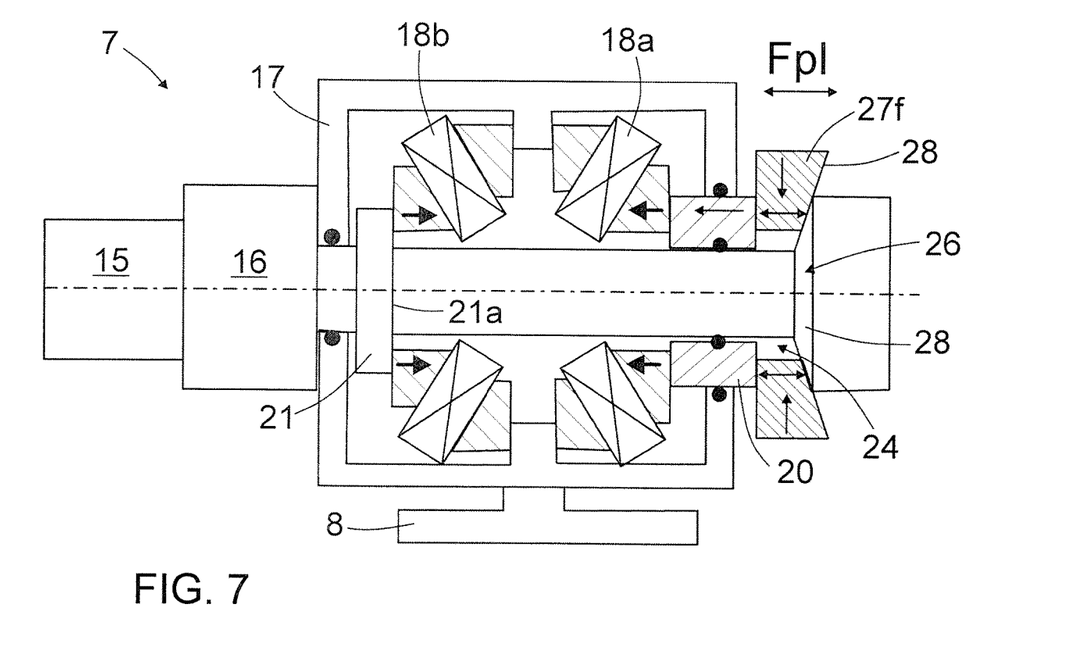
FIG. 7 is a schematic partial cross-sectional view of a rotation unit, wherein an axial adjusting surface of a shaft is provided with wedge surfaces against which corresponding wedge surfaces of half-elements are pressed.
Figure 8:
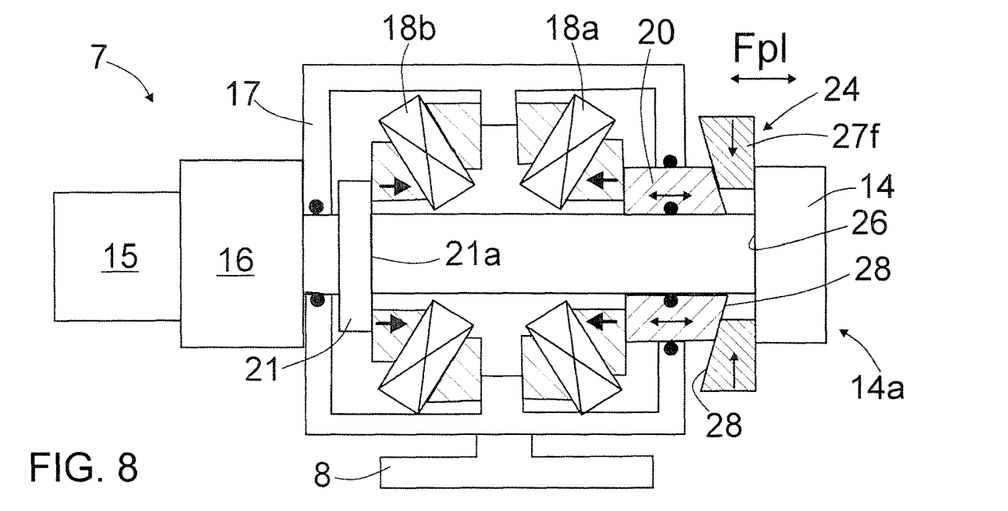
FIG. 8 is a schematic cross-sectional view of a rotation unit, wherein a front end surface of a collar is provided with wedge surfaces against which corresponding wedge surfaces of half-elements are pressed.

FIGS. 7 and 8 show some alternatives to the solution of FIG. 5. The basic structure and operating principles are again the same as in the previous FIGS. 3-5. However, in FIGS. 7 and 8 only the first half-elements 27f with the wedge surfaces 28 are needed. That is because in FIG. 7 the axial adjusting surface 26 of the shaft 14 is slanted and serves thereby as a mating surface for the wedge surfaces 28 of the half-elements 27f. Further, in FIG. 8, the front end surface of the collar 20 is slanted and serves as the mating surface for the wedge surfaces 28.

FIG. 9 shows a rotation unit 7, which applies the basic adjusting principle disclosed in FIG. 5. FIG. 9 further discloses that the first half-elements 27f have lugs 32 and screw holes 33 for tensioning screws 34. Thus, the tensioning screws 34 may be tightened for pressing the first half-elements 27f towards each other and to thereby force wedge surfaces 28 of the first half-elements 27f to move relative to the wedge surfaces 28 of the second half-elements 27g. As can be seen, the first half-elements 27f are thicker at an outer rim than at an inner rim, which is vice versa relative to the second half-elements 27g. Further, the first half elements 27f may have transversal first guide surfaces 35 on the sides facing towards the second half-elements 27g, and the second half-elements 27g may include transversal second guide surfaces 36. Due to the mentioned guide surfaces 35 and 36, the relative adjusting movement of the half-elements 27f and 27g is always controlled. The first guide surfaces 35 may be part of the lugs 32 of the first half-elements 27f, and the second guide surfaces 36 may be formed directly on lateral side surfaces of the second half-elements 27g.

FIG. 9 also shows that the half-elements 27f and 27g are placed at a gap between the collar 20 and the axial adjusting surface 26 of the shaft 14. The gap is part of the adjusting space and is located outside the body 17. The fastening screws 29 and 31 and oval fastening holes 30 are also shown in FIG. 9.

In an alternative solution, the rotation unit may be without any collar, whereby the half-elements may be arranged directly against the axial adjusting surfaces of the bearings. Further, the adjusting space may be located inside the body.

In this way, the body may be provided with an openable lid or corresponding component for allowing access to the adjusting space. Even in these additional embodiments, the use of the disclosed half-elements is beneficial.

In some cases, features disclosed in this application may be used as such, regardless of other features. On the other hand, when necessary, features disclosed in this application may be combined, in order to provide various combinations.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A rotation unit for rock drilling comprising:
   a body;
   a shaft;
   at least one rotating motor;
   transmission members arranged to transmit torque from the at least one rotating motor to the shaft;
   at least one bearing assembly arranged to support the shaft rotationally to the body; and
   an adjusting arrangement configured to generate a pre-load force for the bearing assembly to adjust bearing clearance and for securing the adjusted bearing clearance, wherein the adjusting arrangement includes at least two half-elements, the shaft and the at least one bearing assembly having axial adjusting surfaces facing towards each other and defining an axial adjusting space therebetween, the axial adjusting space opening radially, and the at least two half-elements being mounted to the axial adjusting space in a lateral direction, wherein the axial adjusting space extends at least partly outside the body and the at least two half-elements are mountable and dismountable without dismounting the body and without removing drilling equipment connected to one end of the shaft during use of the rotation unit, wherein the axial adjusting space includes a collar, which is axially movable on the shaft, a first end of the collar disposed axially against the bearing assembly and a second end of the collar facing towards a respective axial adjusting surface of the shaft, and the at least two half-elements are located between the second end of the collar and the axial adjusting surface of the shaft.

2. The rotation unit as claimed in claim 1, wherein the shaft and the second end of the collar extend in the axial direction outside the body, whereby the at least two half-elements are located outside the body.

3. The rotation unit as claimed in claim 1, wherein the at least two half-elements are configured to generate the pre-load force.

4. The rotation unit as claimed in claim 1, wherein the rotation unit is a Down-The-Hole drilling machine component and is without any impact device.

5. The rotation unit as claimed in claim 1, wherein the adjusting arrangement includes a separate or external pre-load member arranged to generate the pre-load force and the bearing clearance, wherein the at least two half-elements are configured to secure the adjusted bearing clearance.

6. The rotation unit as claimed in claim 5, wherein the at least two half-elements form an operating couple, each half-element having a uniform thickness.

7. The rotation unit as claimed in claim 6, wherein the adjusting arrangement includes two or more operating couples having a differing thickness relative to each other.

8. The rotation unit as claimed in claim 1, wherein the adjusting arrangement includes at least two first half-elements, each having a wedge-like configuration, wherein at least one surface of both of the first half elements is slanted, the at least two first half elements having wedge-portions that form an operational couple and are movable in transverse direction relative to the axial direction of the shaft, the adjusting arrangement further including tensioning members for moving the wedge-like half-elements towards each other or apart from each other in the axial adjusting space in order to have an effect on the generated bearing pre-load.

9. The rotation unit as claimed in claim 8, wherein the adjusting arrangement further includes at least two second half-elements forming an operational couple and having wedge-like configuration; and the at least two second half-elements are arranged between the axial adjusting surfaces of the shaft limiting the adjusting space and the wedge-shaped surfaces of the at least two first half-elements, whereby wedge surfaces of the at least two first and second half-elements are arranged against each other.

10. The rotation unit as claimed in claim 9, wherein the at least two first half-elements include the axial wedge surfaces slanting radially towards the shaft so that the thickness is greater at an outer circumference part of the wedge part than at an inner circumference part, and the at least two second half-elements include axial wedge surfaces slanting radially away from the shaft so that the thickness is greater at an inner circumference than at an outer circumference.

11. The rotation unit as claimed in claim 8, wherein the at least two first half-elements are provided with tensioning screws for radially moving the at least two first half-elements forming the operative couple towards each other and away from each other for generating the desired axial preload force for the bearing assembly, and an achieved bearing pre-load force is calculated on the basis of tightening torque of the tensioning screws of the at least two first half-elements.

12. The rotation unit as claimed in claim 11, wherein the at least two first half-elements are provided with several axial fastening screws for locking the at least two first half-elements radially immovably and to thereby prevent relative movements of the at least two first half-elements after adjusting measures have been executed.

13. A method of adjusting bearing clearance of a rotation unit of a rock drilling machine comprising:
providing a rotation unit having a body, a shaft, at least one bearing assembly arranged to support the shaft rotationally to the body, and an adjusting arrangement configured to generate a pre-load force for the bearing assembly, wherein the adjusting arrangement includes at least two half-elements;
generating the pre-load force for the bearing assembly of the shaft for adjusting bearing clearance;
ensuring the bearing clearance by means of the at least two half-elements forming an operative couple; and
arranging the at least two half elements in a transverse direction to an axial adjusting space on an outer surface of the shaft and being axially defined by axial adjusting surfaces of the shaft and the bearing assembly, whereby the axial adjusting space extends at least partly outside the body and the at least two half-elements are mountable and dismountable without dismounting the body and without removing drilling equipment connected to one end of the shaft during use of the rotation unit, wherein the axial adjusting space includes a collar, which is axially movable on the shaft, a first end of the collar disposed axially against the bearing assembly and a second end of the collar facing towards a respective axial adjusting surface of the shaft, and the at least two half-elements are located between the second end of the collar and the axial adjusting surface of the shaft.

* * * * *